UNITED STATES PATENT OFFICE.

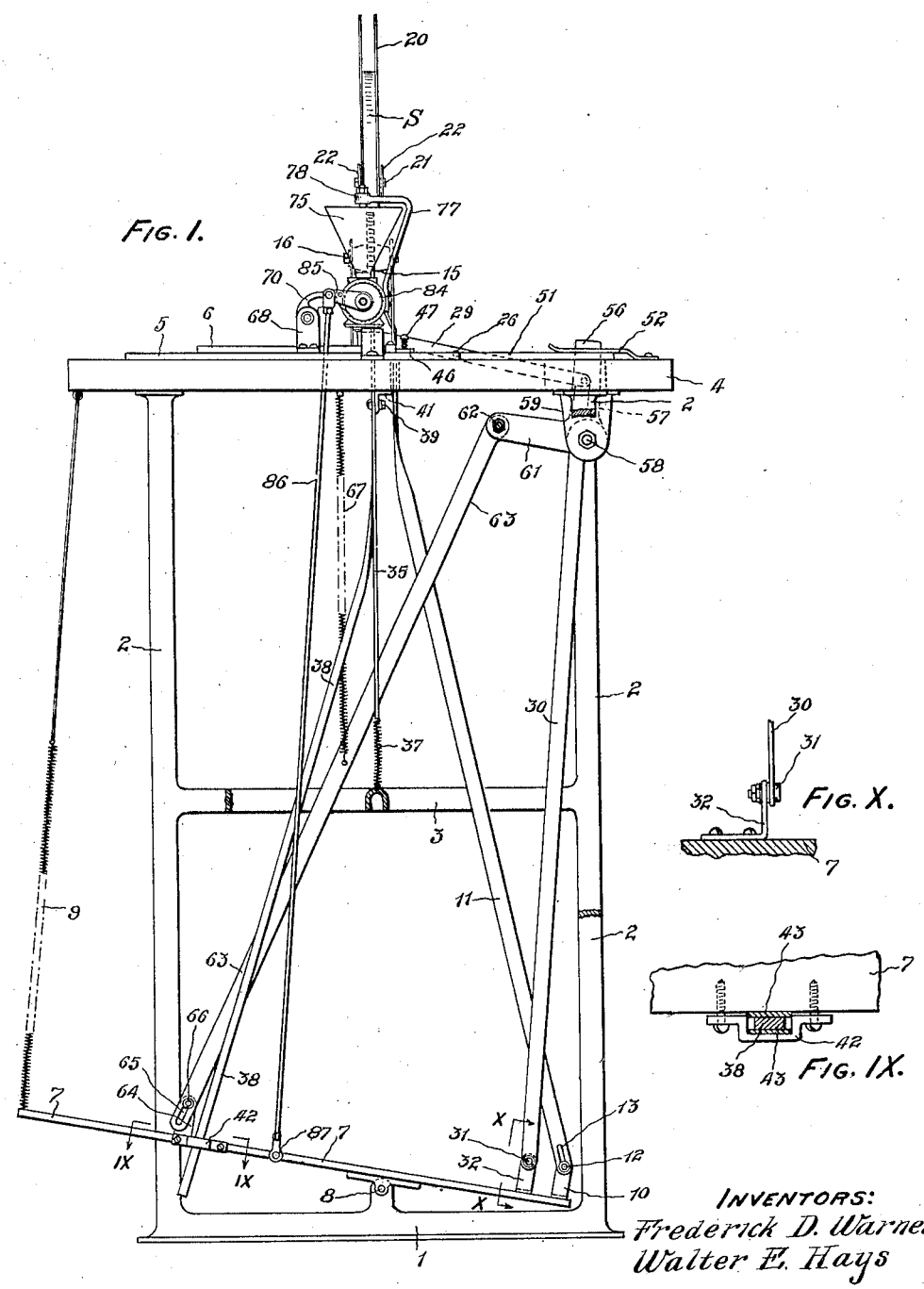

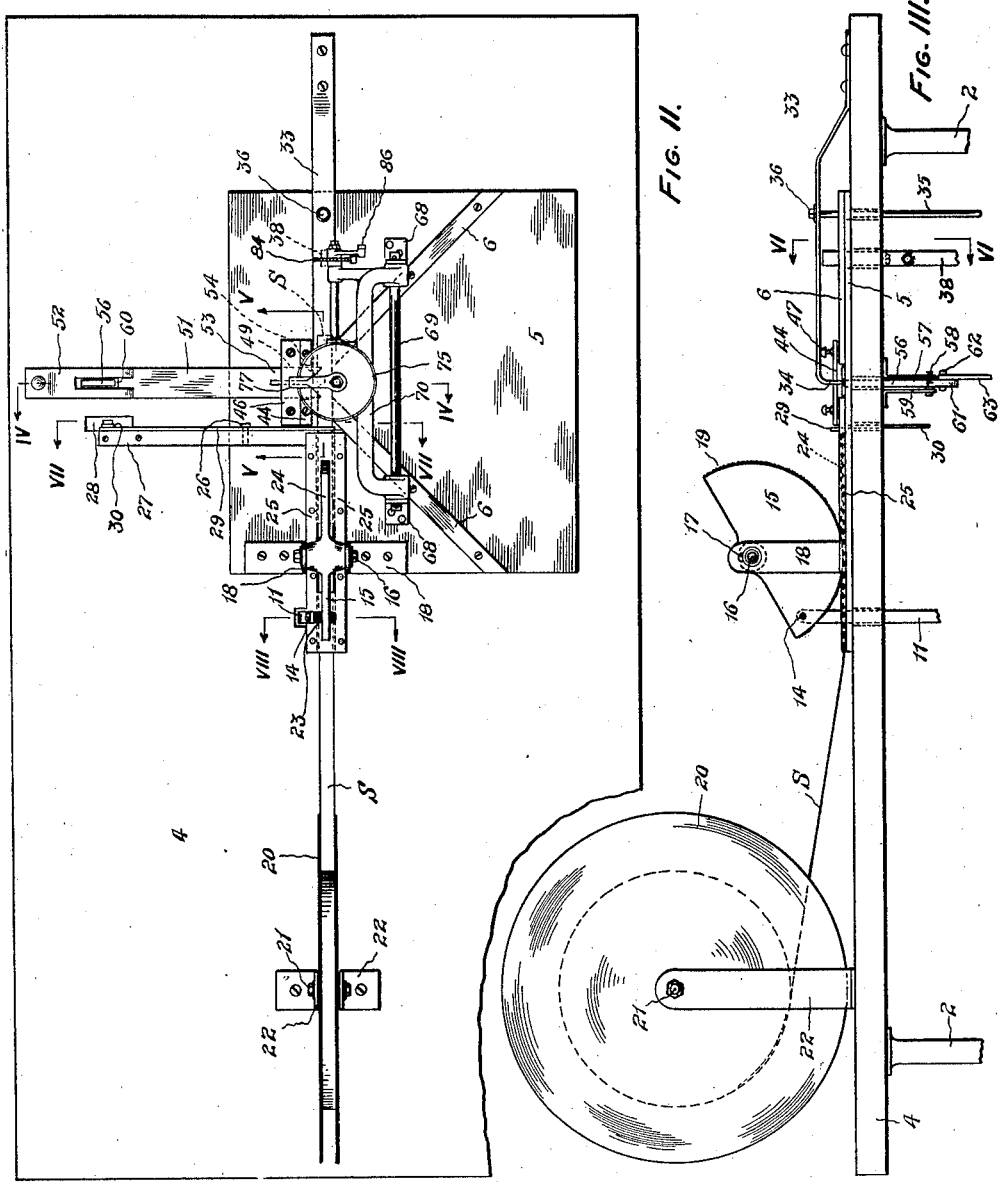

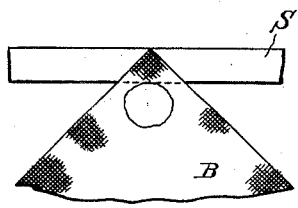
FIG. XVII.
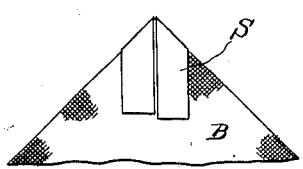
FIG. XVIII.
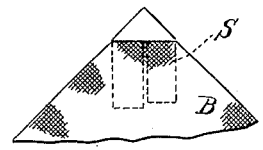
FIG. XIX.
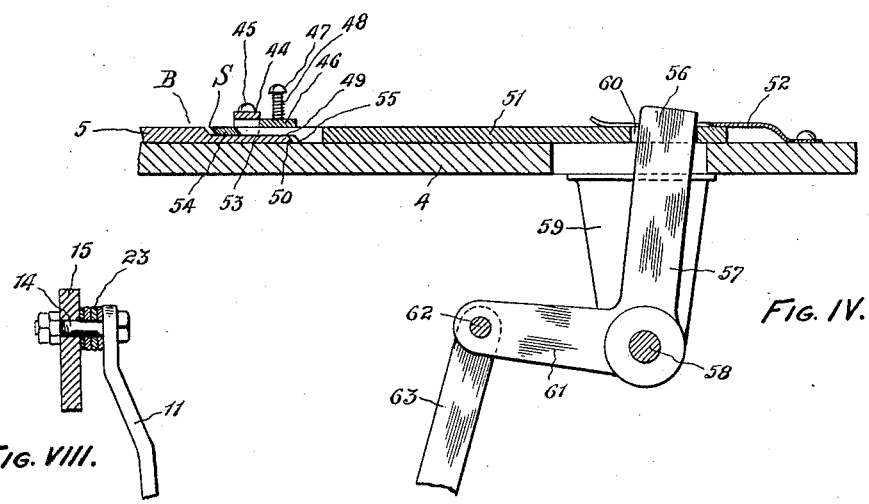
FIG. VIII.
FIG. IV.
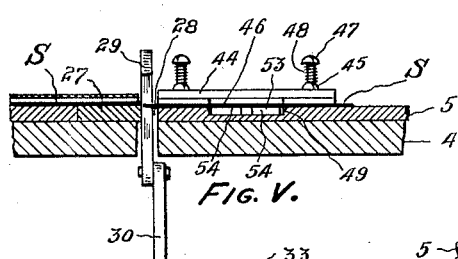
FIG. V.
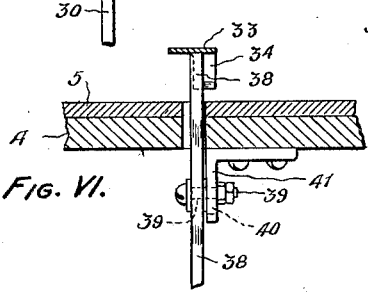
FIG. VI.
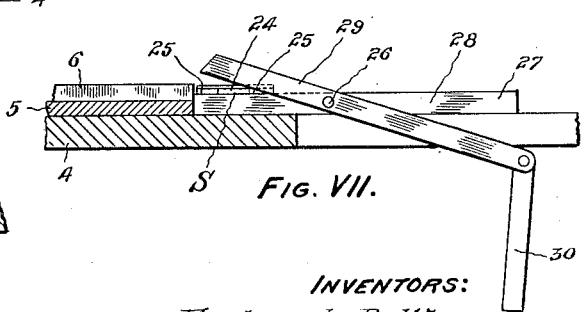
FIG. VII.
INVENTORS:
Frederick D. Warner
Walter E. Hays
BY THEIR ATTY

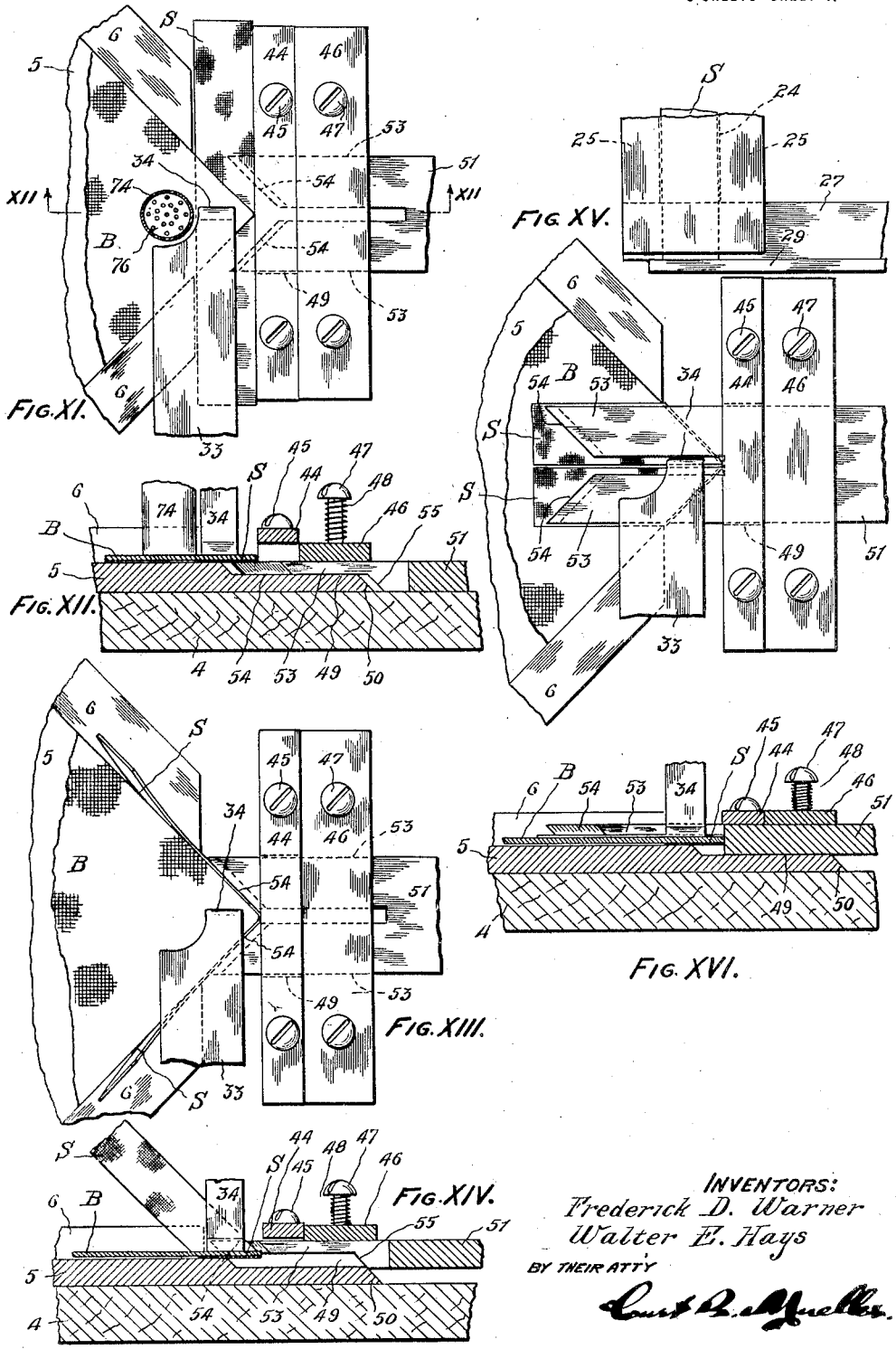

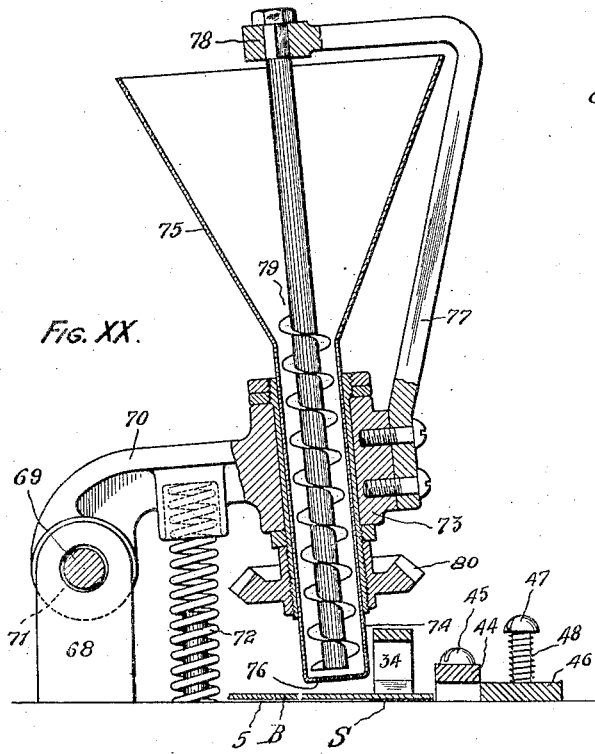
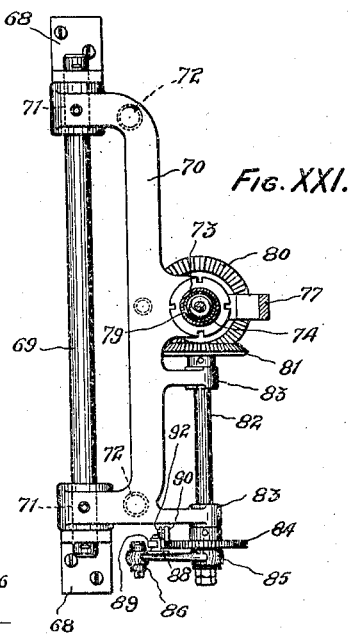
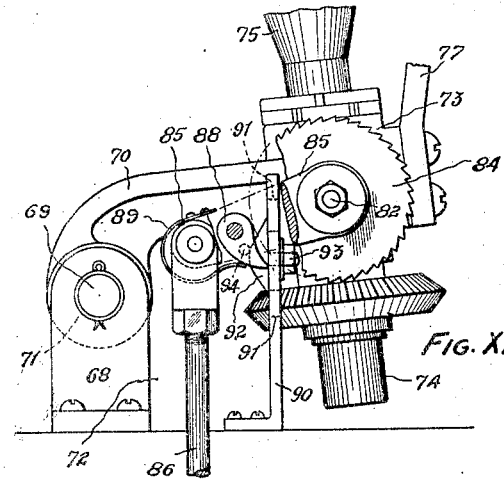
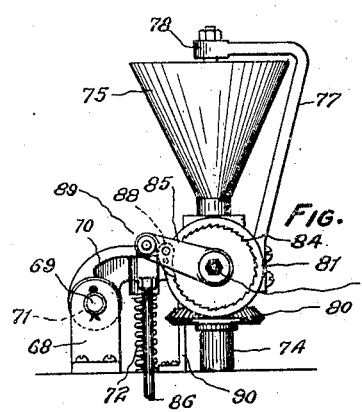
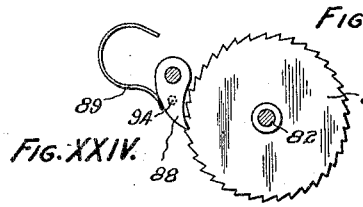

FREDERICK D. WARNER AND WALTER E. HAYS, OF CLEVELAND, OHIO, ASSIGNORS TO THE CHILCOTE-SARGENT COMPANY, OF CLEVELAND, OHIO.

METHOD OF AND MACHINE FOR APPLYING CORNER-CLIPS.

1,355,872.  Specification of Letters Patent.  Patented Oct. 19, 1920.

Application filed January 21, 1918. Serial No. 212,988.

*To all whom it may concern:*

Be it known that we, FREDERICK D. WARNER and WALTER E. HAYS, both citizens of the United States of America, residing at 733 Prospect Ave., city of Cleveland, in the county Cuyahoga and State of Ohio, have invented a new and useful Improvement in Methods of and Machines for Applying Corner-Clips, of which the following is a specification, the principle of the invention being herein explained and the best mode in which we have contemplated applying that principle, so as to distinguish it from other inventions.

Our invention pertains both to the method of and the machine for applying corner clips and according to the exemplification of the drawings such corner clips are formed out of paper strips and caused to inclose and be affixed to the corners of a piece of card board to be mounted in a folder and adapted in turn to secure the four corners of a picture so as to facilitate the mounting thereof.

So far as our knowledge extends paper corner clips which have come into very extensive vogue have been until now very largely if not entirely formed and applied by hand. Our invention permits of a very rapid, uniform and secure attachment of corner clips entirely by machine operation. The successive steps in the method performed by the machine illustrated in the drawings are first, the feeding of a continuous paper strip between and across correspondingly shaped corners of a support and a card board to which the clips are to become attached so that the extremities of the paper strip project a given distance laterally beyond the defining edges of the corner; second, cutting off required lengths of said strip; third, applying a quantity of adhesive to the upper surface of the card board; fourth, holding the card against the support; fifth, lifting the extremities of the strip above the upper surface of the card; sixth, folding the extremities of the strip back upon the area covered with adhesive and finally releasing the holding means preparatory to a repetition of the operation.

Adverting to the drawings:

Figure I is an elevation of the right side of a machine embodying our invention.

Fig. II is a plain view of the top of the machine.

Fig. III is a front elevation of the upper part of the machine.

Fig. IV is an enlarged vertical section taken on line IV—IV of Fig. II.

Fig. V is a correspondingly enlarged vertical section taken on line V—V of Fig. II.

Fig. VI is a similarly enlarged vertical section on line VI—VI of Fig. III.

Fig. VII is a section on line VII—VII of Fig. II, likewise enlarged.

Fig. VIII is an enlarged vertical section on line VIII—VIII of Fig. II.

Fig. IX is an enlarged section on line IX—IX of Fig. I.

Fig. X is an enlarged sectional view taken on line X—X of Fig. I.

Figs. XI and XII are a partial plan view and a vertical section respectively, and still further enlarged, of the clip applying locality of the machine, the parts being shown in the first stage of the operation.

Figs. XIII and XIV are views corresponding to Figs. XI and XII respectively with the parts in the position assumed at the intermediary stage of the operation.

Figs. XV and XVI are a corresponding pair of views showing the relative location of the parts after the conclusion of the operation.

Fig. XVII is a rear plan view showing the relation of the card and corner strip before the latter is folded to assume the form of a clip.

Fig. XVIII is a similar view after the strip has been folded.

Fig. XIX is a front plan view of the card with the finished clip affixed thereto.

Fig. XX is an enlarged side view partly sectioned of the gumming device.

Fig. XXI is a plan view with the upper portion cut away.

Fig. XXII is a broken detail in side elevation of the actuating mechanism.

Fig. XXIII is an end elevation of Fig. XXI.

Fig. XXIV is a diagrammatic view of three details.

Figs. XXV and XXVI are relatively transverse elevations of another detail.

Frame.

The frame of the machine consists of a suitable base 1, a series of upright supports 2 connected by crossbraces 3 (only one of which is shown) and a table 4. The latter is formed at suitable places, as will hereinafter appear, with cut-out areas and somewhat nearer its right end carries a superimposed plate 5. Secured upon the top of the plate 5 are a pair of converging right angularly related guides 6 the inner edges of which conform to angularly related edges of the plate 5. All of the mechanism is operated by a treadle 7 which is pivoted at 8 near the middle of the base 1. The treadle 7 projects in front of the machine and is to be there depressed by the foot of the operator against the action of the spring 9.

Paper feed mechanism.

Upon the rear end of the treadle 7 is a stud 10 with which the lower end of an actuating bar 11 articulates by means of a pin 12 passed through the stud and a slot 13 formed in the bar. The purpose of the slot 13 is to allow a time interval for the reason to be presently explained. The bar 11 projects through the table 4 and is connected above the same with a bolt 14 passed through one corner of a semi-circular segment 15 having its hub mounted upon a journal 16 which is supported in a pair of vertically extending slots 17 formed in two standards 18, all as appears in Figs. I, II and III. The arcuate edge 19 of the segment 15 is serrated and is adapted to engage the paper from which the clips are to be formed in a manner to be now described. Such paper P is in the form of a continuous strip wound upon a reel 20 which is journaled at 21 upon suitable standards 22 near the left end of the machine. It is, of course, desirable to have the paper fed in only one direction and at regular intervals and in order to accomplish this we have designed a peculiar arrangement involving the interpositioning between the upper end of the bar 11 and the segment 15 of a number of leather friction washers 23, clearly seen in Fig. VIII. It will be remembered that the segment 15 is journaled in slots 17 so that it may be bodily lifted therealong. When, therefore, the front of the treadle 7 is depressed and after the pin 12 has moved upwardly through the length of the slot 13 the bar 11 is lifted, but owing to the friction against the washers 23 having first to be overcome the segment 15 is lifted bodily along the slots 17 before it is given its partial reverse rotation. When so lifted its peripheral teeth 19 are moved beyond contact with the paper strip so that the latter is not moved in a direction toward the reel 20. It is clear, however, that during the return movement of the treadle 7 the segment 15 is caused to engage the upper surface of the paper strip which is positioned therebeneath and thereby enabled to move it forward a predetermined distance. The paper strip is in fact caused to be fed along a passage 24 formed by parallel guides 25 shown in Figs. II and VII. The arcuate edge of the segment 15 is designed to enter between the guides 25, as is clearly shown in Fig. III.

Paper cutting device.

After the required length of paper strip has been moved to a position across the upper surface of the coöperating corner formed in the plate 5, preparatory to laying the corner of a card board upon it and supplying the upper surface of such corner of the card with a dab of glue, it is necessary to sever a strip so that substantially equal portions are disposed on each side of the center line of the angular support. To accomplish this we have provided a shearing device, the location of which is indicated in Figs. I, II and III and of which Figs. V and VII are relatively transverse detail views. Pivoted at 26 on an angle support 27 extending in a direction from front to rear along side a suitable opening 28 in the table 4 is a shearing knife 29 having its forward cutting edge adapted to cross the plane of the bottom of the passage 24 as may be seen in either Figs. II or VII. The rear end of the knife 29 articulates with an arm 30 which extends downwardly and is pivoted at 31 to a stud 32 located near the rear end of the treadle 7. It is manifest that when the front end of the treadle is depressed the forward end of the knife 29 is likewise and in doing so severs the strip of paper.

Means for holding the paper and card together.

As soon as a suitable length of the paper strip has been fed to operative position and it has become severed the corner of the card which is to have such length of paper shaped about it to form a clip is manually laid upon that part of the paper which is over the corner of the table 5. Thereafter it is preferable to hold both the card and the paper tightly against the underlying angular support in order not to allow them to shift out of their proper positions during the subsequent folding of the paper strip. To hold the card and paper together we have contrived mechanism, including an upward bowed spring arm 33 having its free end terminating in a downwardly directed narrow finger 34 adapted to contact and press against the upper surface of the card along its center line as is shown in Figs. II and III. Such end is fashioned with an arcuate cut-out portion seen in Figs. XI and XIII for a purpose to be hereinafter explained. Instead of relying entirely upon the spring pressure of the arm 33 it is positively pulled downwardly by means of a rod 35 secured to it at 36 while its other end is yieldingly attached to the cross brace 3 as appears in Fig. I. In order to alternately lift the arm 33 and hence its finger 34 so as to permit the insertion and withdrawal of the card a rod 38 passes upwardly through the table 5 to engage the underside of the arm as appears in Figs. III and VI. Below the table 4 the rod 38 is attached to a bolt 39 which is movable in a slot 40 upon an angle bracket 41 which is secured to the bottom of the table as is illustrated in detail in Fig. VI. The purpose in providing the slot 40 is to limit the upward movement of the rod 38 and therefore the extent to which the arm 33 is lifted. The lower end of the rod 38 is bent and extends in a forward direction to pass between a U shaped bracket 42 which is secured to the side of the treadle 7 as is well shown in Figs. I and IX. The treadle 7 and bracket 42 are faced on opposed sides with leather friction inserts 43. This arrangement enables the initial movement of the treadle 7 to actuate the rod 38 until the bolt 39 reaches one limit of its movement within the slot 40 whereupon the friction between the rod 38 and leather inserts 43 is overcome and relative movement occurs as between the rod 38 and treadle 7. It is evident that with each movement of the treadle 7 in a reverse direction this peculiar action is repeated so that the rod 38 first moves with the treadle and then past the same.

*Strip folding contrivance.*

In order to fold the two ends of the strip of paper S it is necessary to first lift the same above the plane of the upper surface of the card board blank B and thereafter to cause such ends to be laid back upon the top of the blank. This we have accomplished by so actuating an integral member which is guided in its movement to and fro beneath a fixed bridge 44 secured to the plate 5 by means of screws 45, which bridge is located just rearwardly of the vertex of the angle formed by the convergence of the inner edges of the guide 6. Rearwardly adjacent the bridge 44 is another bridge 46 likewise held in place by means of screws 47, which instead of being fixed is movable yieldingly therealong and is normally held in a position somewhat lower than the bridge 44 by means of springs 48 as is clearly shown in Figs. IV and XII. Underneath the bridges 44 and 46 the table 5 is formed with a rearwardly extending channel 49 having two levels between which a sloping surface 50 is formed which is to serve a purpose similar to a cam action, as will presently become manifest. Reciprocable in the channel 49 is a bar 51 having its rear end held therein by means of a split spring finger 52 as appears in Figs. II and IV. The forward end of the bar 51 is forked to form a pair of prongs 53 having converging opposed edges 54. The prongs 53 are moreover of less thickness than the rest of the bar 51 and at their junction therewith is a rearwardly sloping surface 55 of corresponding angularity to that of the surface 50 as may be seen in Fig. IV. As will be observed upon inspection of such Fig. IV, when the prongs 53 are resting upon the upper level of the channel 49 they snugly fill the space between such level and the bridge 46, whereas the thickness of the bar 51 corresponds to the distance between such upper level of the channel 49 and the bridge 44. Directing attention again to Fig. IV it is noticed that the upper end 56 of one arm 57 of a bell crank lever pivoted at 58 to a depending bracket 59 passes through a suitable opening 60 in the rear end of the bar 51 and between the divisions of the split spring 52. The other arm 61 of the bell crank lever articulates at 62 with a rod 63 extending downwardly and forwardly to be connected with a bracket 64 upon the treadle 7 by means of a slot 65 in the rod and a bolt 66 passing therethrough and carried by the bracket. The action of the rod 63 is partly controlled by a spring 67 connected to the underside of the table 4 and tending constantly to lift it. The slot 65 allows an interval of time during which the paper is cut and the finger 34 depressed prior to the operation of the folding contrivance in the manner to be now described. When the treadle 7 is depressed the rod 63 moves downwardly against the action of the spring 67 which rocks the arm 61 downwardly and therefore the arm 57 forwardly. In so doing the bar 51 is slid along in a forward direction within the channel 49 until its inclined surface 55 engages the inclined surface 50, after which its continued forward movement causes it to rise therealong as indicated in Fig. XIV and thereby causes it in turn to lift the bridge 46. In the meantime the prongs 53 have raised the ends of the strip S. After the inclined surface 55 has moved above the inclined surface 50 the compound movement ceases and the bar 51 continues forwardly on the upper level of the channel 49 and is rigidly confined underneath the fixed bridge 44. Thereafter the prongs 53, which have been elevated above the upper surface of the blank, pass forwardly over the same and lay the two ends of the strip back thereupon so as to press the same against the area which has been supplied with adhesive, as will now be described.

Gumming device.

Mounted above the plate 5 upon a pair of supports 68 and located, as appears in Fig. II, outside of the guides 6, so as to straddle them, is a shaft 69. Oscillatorily mounted upon the shaft 69 is a bowed bracket 70 having bent ends formed with bearings 71 through which the shaft 69 passes. The bracket 70 projects in a direction toward the point of convergence of the guide 6 and is normally held in a predetermined position by two compression springs 72 which are interposed between the table and opposite ends of the bracket. One of these springs is shown in both Figs. XX and XXIII. The middle of the bracket 70 is formed with a bearing structure 73 through which the lower tubular extension 74 of a funnel 75 extends in the manner shown in Fig. XX. It is to accommodate and allow for the movement of this extension that the arcuate cut-out is formed in the arm 33. This funnel is to be filled with a suitable gumming or adhesive substance. Its lower end is provided with a plurality of perforations 76 through which the glue is to reach the upper surface of the card board and at a point thereon which is to be overlapped by the ends of the strip S. The exact location of such point is evidenced upon inspection of Figs. II, XI, XIII and XXII. The normal position of the perforated bottom is a short distance above the upper surface of the inserted card as is shown in Fig. XX. An angular arm 77 is secured to the bearing 73 and passes around the upper edge of the funnel 75 to a point in line with the axis thereof where it is provided with a bearing 78 so as to support the upper end of a screw 79 having its lower threaded portion fitted within the tube 74. The purpose of the screw 79 is to conduct the glue downwardly toward the perforation 76, but instead of rotating the screw we have preferred to effect the necessary relative movement by rotating the funnel as will now be described. Fixed to the tube 74, below the bearing 73, is a beveled gear 80, the same being in mesh with a beveled pinion 81 upon a shaft 82 which is supported in a horizontal bearing 83 as may be seen in Fig. XXI. The other end of the shaft 82 carries a fixed ratchet 84 and adjacent the same a loosely mounted lever 85. The free end of the lever 85 articulates with the upper end of the rod 86 which in turn articulates at 87 with the forward portion of the treadle 7. The lever 85 carries a pawl 88 adapted to engage the teeth of the ratchet and normally pressed toward the same by a spring 89 as diagrammatically shown in Fig. XXIV. It will now be understood that whenever the treadle 7 is depressed the rod 86 will be moved downwardly and the lever 85 likewise, so that the pawl 88 acts to impart a partial rotation to the ratchet 84 and consequently through the shaft 82 and beveled gears 81 and 80 to the funnel. Prior, however, to imparting such rotational movement the downward pull upon the rod 86 first overcomes the comparatively slight resistance offered by the spring 72 so that the perforated lower extremity of the funnel has been brought into engagement with the upper surface of the card. Accordingly, when the glue is being forced through the perforation 76 instead of reaching the card in the form of a series of drops becomes a smear as is shown in Fig. XVII. Conditions make it desirable to provide means for regulating the amount of glue to be supplied. Our arrangement makes it possible to automatically accomplish this also in the following manner: A standard 90 is provided with a vertical slot 91 along which a cam 92 may be adjusted and secured by means of a nut 93. This cam is so positioned as to be engaged by a pin 94 upon the pawl 88. During the downward movement of the lever 85 and therefore during the effective movement of the pawl 88 the pin 94 rides over the surface of the cam 92 which latter presently swings the tip of the pawl out of engagement with the teeth of the ratchet 84 so that further downward movement becomes ineffective and the spring 72 is permitted to effect the upward release of the entire structure. By adjusting the elevation of the pawl 92 the time during which the pawl 88 turns the ratchet may be varied at will as will be readily understood.

It will be observed that the functioning of this gluing device is coincident with the functioning of the paper feed and paper shearing devices and in advance of the functioning of the strip folding contrivance so that the lower extremity of the funnel is lifted out of the way prior to the forward movement of the prongs 53.

We claim:

1. The method of applying corner clips which consists in firmly supporting a blank, feeding a flexible member across the corner and on one side of said blank so that the ends of said member extend beyond different edges of said blank, severing said flexible member at a point beyond the area inclosed by said blank edges, pressing said blank and the severed portion of said member together and causing the ends of said member to be folded against the opposite side of said blank.

2. The method of applying corner clips which consists in synchronously effecting a relative compression as between two members while one extends across one side of and beyond different edges of the other, applying an adhesive to the opposite side of such other member, and successively moving the free ends of said crosswise extending member toward and folding the said ends about said edges and against the opposite side of such other member with a continuous compound movement.

3. A machine of the character described comprising a support having edges substantially conforming in angularity to the corner of the card to be operated upon, means for moving a flexible strip across one side of said support so that ends of the strip extend beyond different edges of such support, and means for folding said strip ends in a direction away from such side, around the edges of said card and against such card while the latter is placed against the interjacent portion of said strip.

4. A machine of the character described comprising a support having edges substantially conforming in angularity to the corner of the card to be operated upon, means for moving a flexible strip across one side of said support, and automatically operating means for folding end portions of said strip which project beyond such edges against such card while the latter is placed against the interjacent portion of said strip.

5. A machine of the character described comprising a support having edges substantially conforming in angularity to the corner of the card to be operated upon, means for moving a flexible strip across one side of said support and beyond its edges, means for pressing said strip and a contiguous card together against said support, a device for folding said strip extremities around the corresponding edges of said card and against the exposed side thereof, and means for actuating said device relative to and parallel to the plane of said support.

6. A machine of the character described comprising a support upon which a picture card mount may be laid so as to have edges projecting beyond the edges of said support, means for feeding a flexible strip between said support and card, and means for folding portions of said strip upon the exposed side of said card.

7. A machine of the character described comprising a support upon which a picture card mount may be laid so as to have edges extending beyond the edges of said support, means for feeding a flexible strip across said support, means for pressing said card and strip together against said support and means for simultaneously folding portions of said strip against the exposed side of said card.

8. A machine of the character described comprising a support upon which a picture card mount may be laid so as to have edges disposed beyond the edges of said support, means for feeding a flexible strip across said support so as to have its extremities beyond the edges thereof, means for pressing said card and strip together against said support, a device adapted successively to bend and lay said extremities back upon said card, and means for actuating said device.

9. The method of applying corner clips which consists in feeding an endless flexible strip across the corner and adjacent one side of a card so that portions of said strip extend beyond the defining edges of the corner of the card, cutting off a predetermined length of said strip, holding the card and strip in engagement with each other, bending the two extremities of the strip around the defining edges of the card and finally folding such ends against the opposite side of the card in a direction at an angle to the direction of strip feed.

10. The method of applying corner clips which consists in feeding a flexible strip across the corner and contiguous to one side of a card so that end portions of said strip are disposed beyond two defining edges of said card corner, applying a quantity of adhesive to the reverse side of said card at a point opposite its engagement with the portion of said flexible strip, intermediately of its end portions, holding the card and strip temporarily in position and finally folding the ends of the strip around and upon the reverse side of said card.

11. The method of applying corner clips which consists in successively bringing the corner of a card and a substantially flat flexible strip into juxtaposition so that end portions of said strip project beyond defining edges of said corner respectively effecting pressure against the relatively remote sides of said strip ends and card corner in opposite directions respectively so as to cause the projecting portions of the strip to be folded around the angularly related edges of the card corner and finally laying the ends of said strips alongside each other against the reverse side of the card.

12. The combination with a device for feeding corner-clip strip material, of a folding contrivance movable in two distinct directions across a middle section of said strip so as to fold the ends of said strip around angularly related corner edges of a card while the latter is being held against the middle area of said strip.

13. The combination with devices for feeding a continuous corner-clip strip and severing lengths thereof, of a folding contrivance successively movable at two distinct angles to the direction of strip feed so as to first fold the ends of said strip around the corner edges of a card when its one side is held against the middle area of said strip and so as to next lay said strip ends against the other side of said card.

14. A machine of the character described comprising a support for the corner of the member which is to be provided with a clip, a corner-clip forming blank strip, means for feeding said strip across the corner of said member, means for pressing said strip together with the corner of said member against said support, and means for folding the ends of said strip around different edges of the corner of said member, the action of said various means being suitably timed.

15. A machine of the character described comprising a support for the corner of the card which is to be provided with a clip, a blank strip, means for feeding said strip across the corner of said card, means for pressing said strip between such card and said support, and means for folding the ends of said strip around edges of the corner of said card and for laying said strip ends against the exposed side of said card, said folding means being successively movable in two distinct directions to accomplish such object.

16. A combination substantially as set forth, with devices for holding a corner-clip forming strip across the corner of a card and folding the ends of the strip around the card corner, of a finger coöperating to hold said strip and card together, and means for actuating the folding device against the ends of said strip.

17. The combination substantially as set forth, with devices for holding a corner-clip forming strip across the corner of one side of a card and folding the ends of the strip around the card corner, of a finger pressing said card against said strip near the median line of the card corner, and means for actuating the folding device to bend the ends of said strip and then lay them back upon the other side of the card on opposite sides of said finger.

18. A machine of the character described comprising means for holding a card corner and flexible strip in juxtaposition with ends of the latter projecting beyond defining edges of the former, a member for moving said strip ends relative to the plane of said card, and means for effecting the compound movement of said member.

19. A machine of the character described comprising means for holding one side of a card corner and flexible strip in juxtaposition with ends of the latter projecting beyond defining edges of the corner, a device for bending said strip ends first toward and then against the opposite side of said card, and means for actuating said device successively in a plurality of directions to accomplish the object intended.

20. A machine of the character described comprising means for holding one side of a card corner and flexible strip in juxtaposition with ends of the latter projection beyond defining edges of the former, a contrivance for applying glue to the exposed side of said card corner, a device for bending said strip ends first toward and then against the glued area of said card, and means for synchronously actuating said contrivance toward said card and said device successively in a plurality of directions.

21. A machine of the character described comprising a frame, a support, an actuating member, means for feeding a strip between said support and a card corner, means for pressing said strip and card against said support, and means for folding portions of said strip around the edges of said card corner, all of said distinct means being operatively connected with said member.

22. The method of applying corner clips which consists in effecting a relative compression as between a card and a flexible strip while the latter extends across one corner of and beyond the edges of the former, and simultaneously moving the two ends of said flexible strip angularly with respect to the plane of its contact with said card and thereafter simultaneously laying back both ends of said strip against the opposite side of the card.

23. The method of applying corner clips which consists in effecting a relative compression as between a card and a flexible strip while the latter extends across one side of a corner of and beyond the edges of the former, and moving the two ends of said flexible strip angularly with respect to the plane of its contact with said card applying adhesive to the opposite side of said corner and thereafter laying back both ends of said strip against such opposite side of the card.

24. A machine of the character described comprising means for holding in juxtaposition a card corner and flexible strip so that the latter extends across two converging edges of the former and with the ends of such strip projecting beyond such converging edges of said corner, a device for moving said strip ends relative to the plane of said card, and means for actuating said device.

25. The method of applying corner clips which consists in firmly supporting the blank, feeding a flexible strip of indeterminate length across the corner and to one side of said blank so that the ends of said strip extend beyond different edges of said blank, cutting off a predetermined length of said strip, pressing said definitely sized strip portion and blank together, and thereafter causing the ends of said strip portion to be folded against the opposite side of said blank.

26. The method of applying corner clips which consists in firmly supporting a blank, intermittently feeding a flexible strip of indeterminate length across a corner and to one side of said blank so that the advanced end of said strip extends beyond one of the corner defining edges of said blank, cutting off a predetermined length of said strip at a point beyond the other defining edge of the same corner of the blank, pressing the juxtaposed portions of said blank and strip together, and thereafter causing the ends of the severed strip portion to be folded at an angle to the direction of strip feed and against the opposite side of said blank.

27. The herein described method which consists in supporting a corner of a blank, feeding a flexible strip thereacross, holding the blank and strip together, and folding free extremities of the strip around edges of the blank in such a way as to cause such folded ends to lie alongside of each other against the opposite side of the blank.

28. The method of applying clips, which consists in supporting a blank, feeding a strip across one side of said blank so as to leave ends of said strip beyond defining edges of said blank, simultaneously lifting the strip ends of said strip, and simultaneously folding said ends back against the other side of said blank in a direction across the direction of extent of the unfolded portion of strip.

29. The method of applying corner clips, which consists in supporting a blank, feeding a strip across the lower side of a corner of said blank so as to leave ends of said strip beyond the defining edges of the corner of said blank, lifting the ends of said strip which are disposed beyond different edges of said corner, and folding said ends back upon the upper side of said corner in a direction substantially at right angles to the direction of extent of the middle portion of strip which crosses said corner.

Signed by us this 31st day of December, 1917.

FRED D. WARNER.
WALTER E. HAYS.